United States Patent
Ontiveros et al.

(10) Patent No.: US 11,522,285 B1
(45) Date of Patent: Dec. 6, 2022

(54) BEAM STEERING AND BEAM FORMING AN ANTENNA

(71) Applicant: Naval Information Warfare Center Pacific, San Diego, CA (US)

(72) Inventors: Marcos Ontiveros, Chula Vista, CA (US); Ayax D Ramirez, Chula Vista, CA (US); Stephen D Russell, San Diego, CA (US); Michael P Daly, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 17/412,590

(22) Filed: Aug. 26, 2021

(51) Int. Cl.
*H01Q 3/26* (2006.01)
*H04B 7/06* (2006.01)

(52) U.S. Cl.
CPC ......... *H01Q 3/2676* (2013.01); *H04B 7/0617* (2013.01)

(58) Field of Classification Search
CPC .... H01Q 3/2676; H04B 7/0617; G02F 1/2955

USPC ........................................................ 375/267
See application file for complete search history.

(56) References Cited

U.S. PATENT DOCUMENTS

2018/0309515 A1* 10/2018 Murakowski ...... H04B 10/2575

* cited by examiner

*Primary Examiner* — Sam K Ahn
*Assistant Examiner* — Gina M McKie
(74) *Attorney, Agent, or Firm* — Naval Information Warfare Center, Pacific; Kyle Eppele; Matthew D. Pangallo

(57) ABSTRACT

A method for beam steering and beam forming an antenna is disclosed herein that includes illuminating an optical fiber with a light source, thereby transmitting a signal through the optical fiber to an electro-optical switch. The electro-optical switch is actuated with the signal from the light source, thereby switching an electrical load in the electro-optical switch. At least one antenna element in an array of antenna elements is excited with RF radiation radiated by a driven element via an RF transmission line and reradiated from parasitic elements, thereby beam steering and beam forming the antenna.

16 Claims, 4 Drawing Sheets

BEAM STEERING AND BEAM FORMING AN ANTENNA

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

BACKGROUND

Generally, most antennas use electrical, electro-mechanical, or mechanical systems for beam forming or beam steering. These systems include electrical, electro-mechanical, or mechanical switches that allow an antenna to move or modify elements of the antenna to change the shape, direction, both the shape and direction of the beam. The faster antennas can beam form or beam steer, the better the performance of the antenna. Faster beam steering and beam forming results in greater data throughput, faster link acquisition, greater interference mitigation, increased anti jam capability, etc. Therefore, the electrical, electro-mechanical, or mechanical switches themselves are important components of antenna systems.

DESCRIPTION OF THE DRAWINGS

Features and advantages of examples of the present disclosure will be apparent by reference to the following detailed description and drawings, in which like reference numerals correspond to similar, but in some instances, not identical, components. Reference numerals or features having a previously described function may or may not be described in connection with other drawings in which they appear.

DETAILED DESCRIPTION

Currently, most antennas use electrical, electro-mechanical, or mechanical switches to beam steer and beam form antennas. Although these switches can result in fast beam steering and beam forming, these switches are complicated, require a high amount of manufacturing precision, require a large physical size to function, and are more expensive to implement. Some antennas use electro-optical switches. However, some current electro-optical switches are placed directly on the radiating elements, which reduces the antenna's efficiency. In addition, some antennas that use electro-optical switches allow for reconfigurable antennas that do not possess beam forming or beam steering capabilities. As a result, the radiation patterns will be closer to isotropic.

In the method herein, electro-optical switches are used to steer and form beams, which allows the antenna to steer and form beams much faster than conventional methods (i.e., using electrical or mechanical switches). In addition, the method herein is a low-cost, less complicated beam steering and beam forming system compared to known systems. The beam steering and beam forming system herein only requires a single radiating element with a simple RF feed circuit and some parasitic elements directly connected to the optical switch. In contrast, known systems use phased arrays, which require very complicated and costly antenna and RF designs. Known antenna systems also introduce switches to the radiating element, which causes significant power losses as well as distortion in the radiating pattern. The system and method herein does not introduce switches to the radiating element, thereby avoiding power losses and distorted radiating patterns.

The method for beam steering and beam forming an antenna is disclosed herein that includes illuminating an optical fiber with a light source, thereby transmitting a signal through the optical fiber to an electro-optical switch. The electro-optical switch is actuated with the signal from the light source, thereby switching an electrical load in the electro-optical switch. At least one antenna element in an array of antenna elements is excited with RF radiation radiated by a driven element via an RF transmission line and reradiated from parasitic elements, thereby beam steering and beam forming the antenna.

Figure 1:
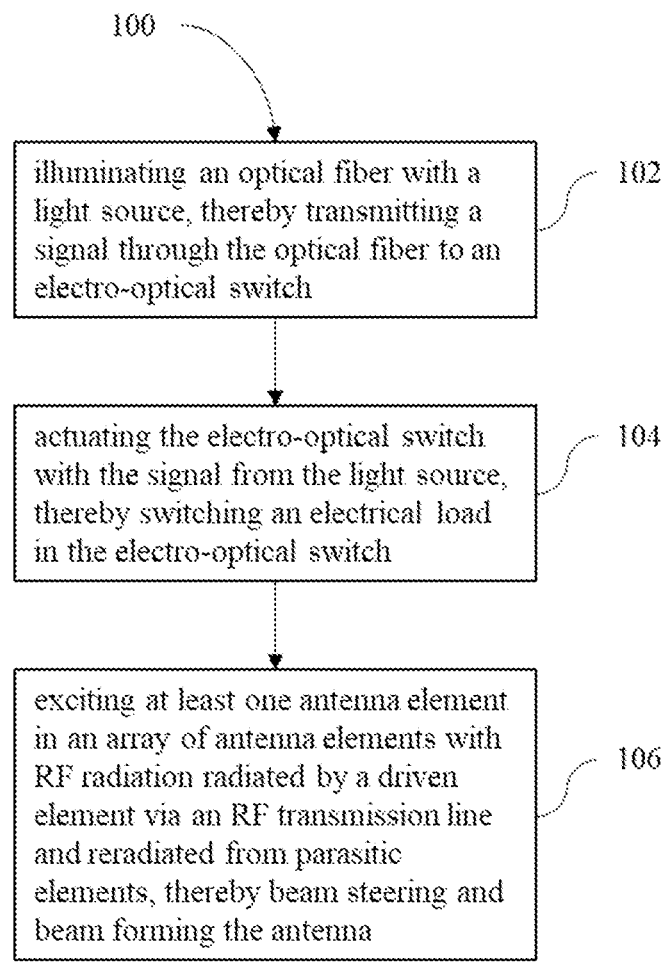
FIG. 1 is an example of a method for beam steering and beam forming an antenna, comprising as described herein.

Referring now to FIG. 1, the method 100 includes 102 illuminating an optical fiber with a light source, thereby transmitting a signal through the optical fiber to an electro-optical switch. The light source may be actuated by control voltages connected to any known control circuitry. The signal is a light signal with varied intensity and wavelength depending on the optical switch being used. In some examples, there is a single light source and a single optical fiber for each individual electro-optical switch. In another example, the optical fiber is a fiber bundle associated with a plurality of electro-optical switches and a single light source is used to illuminate the optical fiber bundle and actuate a plurality of electro-optical switches. Some examples of the light source include a free space diode laser or an assembly of optical elements diode laser. The optical fiber may be any known optical fiber capable of transmitting the light signal produced by the light source.

The electro-optical switch is connected to the optical fiber and receives the signal from the optical fiber. The electro-optical switch may be composed of material selected from the group consisting of lithium niobate, group III-V or group II-VI semi-conductors, silicon, group IV semiconductors, alloys thereof, and heterostructures thereof.

Referring back to FIG. 1, the method 100 includes 104 actuating the electro-optical switch with the signal from the light source, thereby switching an electrical load in the electro-optical switch. The electro-optical switch includes two loads to switch between based on the signal being received. Anytime the light signal is transmitted to the electro-optical switch, the load switches causing RF power (i.e., RF radiation) to be sent via an RF transmission line to an antenna element or multiple antenna elements depending on the design.

Referring again to FIG. 1, the method 100 includes 106 exciting at least one antenna element in an array of antenna elements with RF radiation radiated by a driven element via an RF transmission line and reradiated from parasitic elements, thereby beam steering and beam forming the antenna. Any known driven element or parasitic elements may be used depending on the type of antenna. The antenna elements may be antenna elements in any antenna capable of utilizing electro-optical switches. Some examples include the antenna elements in an antenna selected from the group consisting of 2-dimensional patch antennas, phased array antennas, and 3-dimensional antennas. Some examples of the 3-dimensional antennas include an ESPAR antenna or a Yagi antenna.

Figure 2:
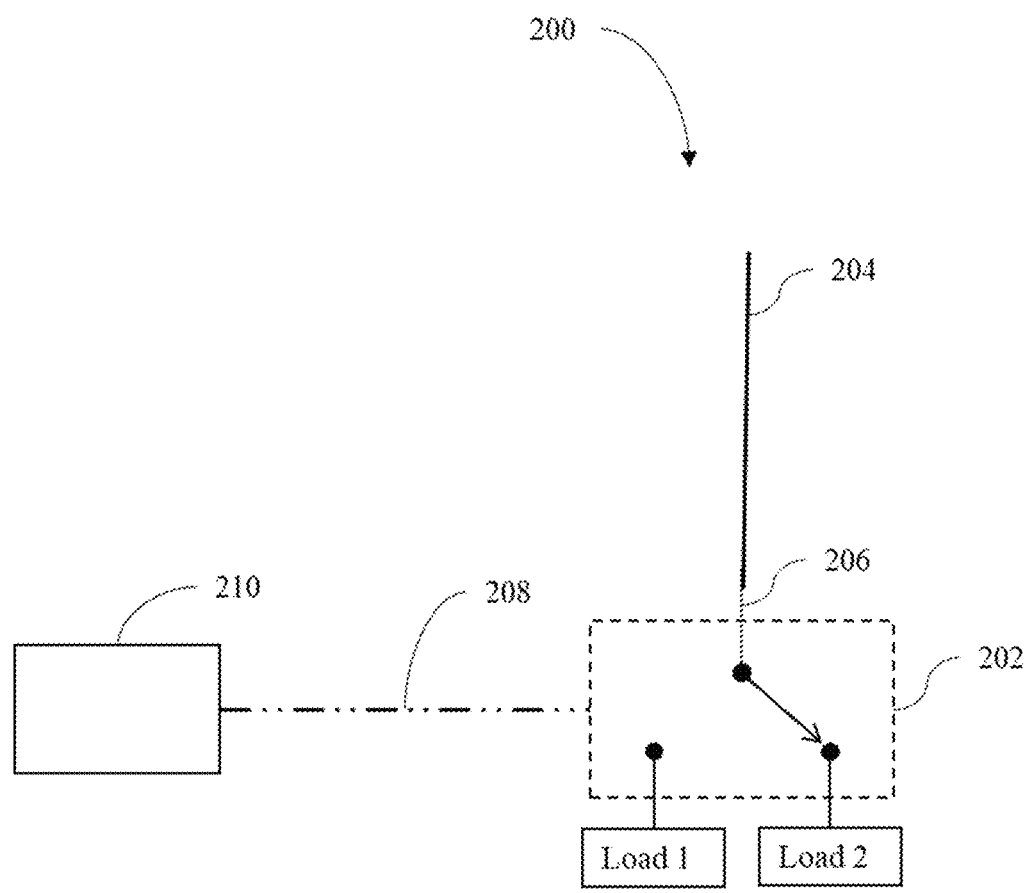
FIG. 2 is an example of an individual parasitic element with an electro-optical switch.

FIG. 2 shows an example of an individual parasitic element with an electro-optical switch 200. In FIG. 2, the light source 210 illuminates optical fiber 208 that transmits a signal to the electro-optical switch 202. The signal causes the electro-optical switch 202 to actuate from Load 1 to Load 2, thereby causing a change in the RF radiation and exciting at least one parasitic element 204 via a RF transmission line 206 causing the parasitic elements to reradiate the RF radiation. In the example shown in FIG. 2, an individual electro-optical switch is connected to an individual antenna element (e.g., a parasitic element). In other examples not depicted in FIG. 2, an individual electro-optical switch is connected to a plurality of antenna elements. In yet another example, a plurality of electro-optical switches are connected to each individual antenna element. It is noted that FIG. 2 includes dashed lines for illustrative purposes only to aid in viewing and should not be construed as being limiting or directed to a particular material or materials.

A system for beam steering and beam forming an antenna is also disclosed herein. The system includes a light source, an electro-optical switch, and an antenna element. The light source illuminates an optical fiber, thereby transmitting a signal through the optical fiber. The electro-optical switch receives the signal from the optical fiber, wherein the signal actuates the electro-optical switch changing an electrical load in the electro-optical switch. The antenna element is excited by RF radiation radiated by a driven element via an RF transmission line and reradiated from parasitic elements causing the steering and beam forming of the antenna.

Figure 3:
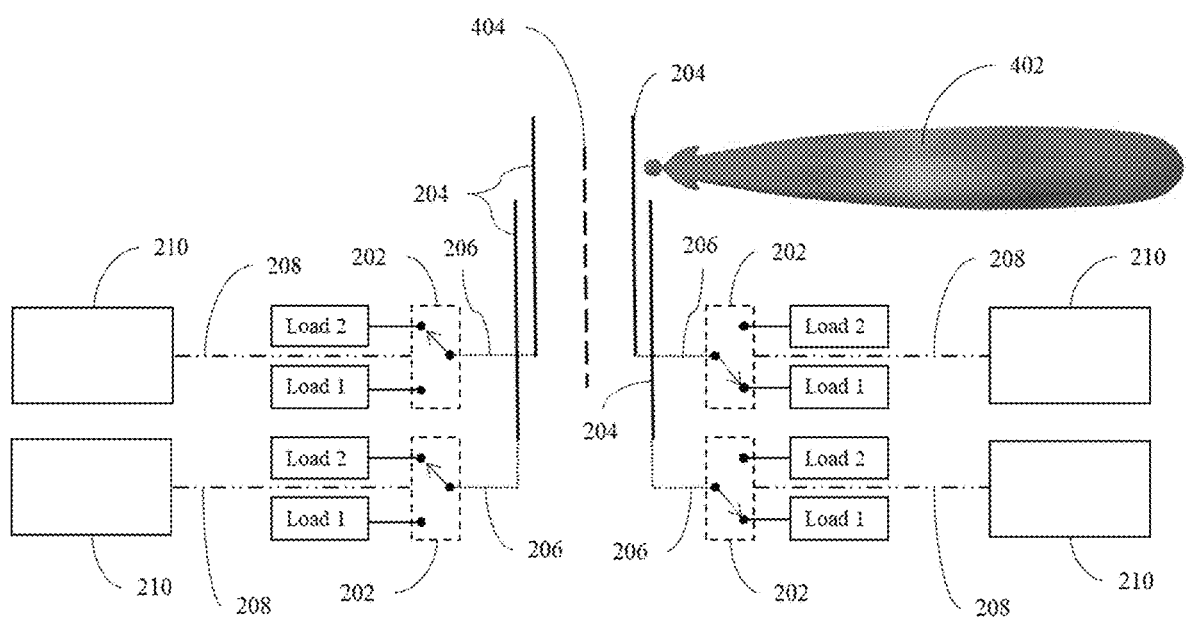
FIG. 3 is an example of an Electronically Steered Parasitic Array Radiator (ESPAR) antenna beam steering and beam forming with electro-optical switches.
Figure 4:
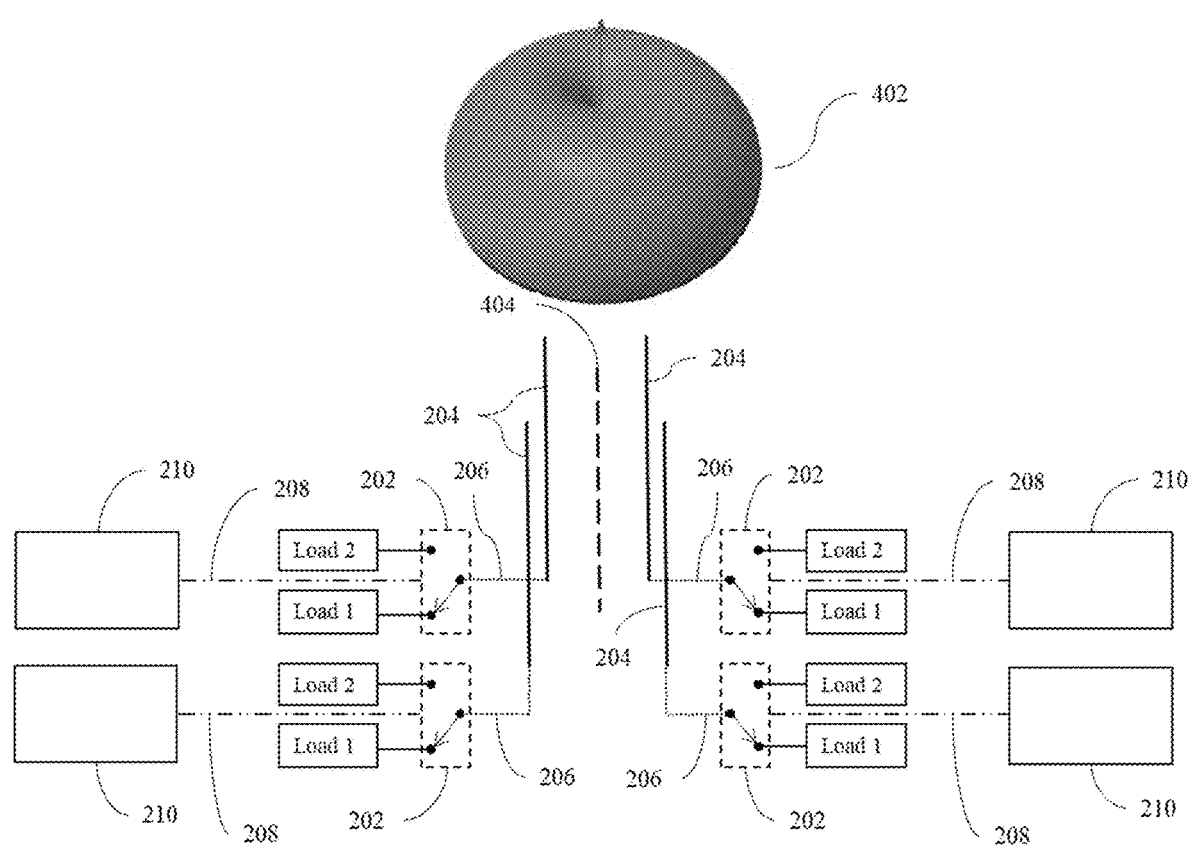
FIG. 4 is another example of an ESPAR antenna beam steering and beam forming with electro-optical switches.

The system herein uses the same light source, electro-optical switch, and antenna element previously described herein. FIG. 3 and FIG. 4 show an example of the system described herein. In FIG. 3, four electro-optical switches 202 are shown. Each electro-optical switch 202 is connected to a single light source 210 and an individual optical fiber 208. Additionally, each electro-optical switch 202 is connected to an individual parasitic element 204 through a RF transmission line 206. When the light source 210 produces a signal, the signal is transmitted through the optical fiber 208 to the electro-optical switch 202. The signal causes the electro-optical switch 202 to actuate and switch from Load 1 to Load 2. Load 2 reflects the radiation from the driven element 404 differently than Load 1 and that reflected radiation is transmitted via the RF transmission line 206 to the parasitic elements 204 where the RF radiation is reradiated by the parasitic elements 204. In the example in FIG. 3, the parasitic elements 204 are implemented because Load 2 reflects the radiation from the driven element 404 in a way to cause a shape and direction of the antenna beam 402. This is shown in the example of FIG. 3 with the antenna beam 402 forming a directional beam in the shape of an oval. In other examples, Load 2 may cause any known shape and direction of the antenna beam 402. It is noted that FIG. 3 includes dashed lines for illustrative purposes only to aid in viewing and should not be construed as being limiting or directed to a particular material or materials.

Similarly, in FIG. 4, when the light source 210 produces another signal, this signal is transmitted through the optical fiber 208 to the electro-optical switch 202. The signal causes the electro-optical switch 202 to actuate and switch from Load 2 to Load 1. Load 1 radiates the radiation from the driven element 404 differently than Load 2, and the radiated radiation is transmitted via the RF transmission line 206 to the parasitic elements 204, which reradiate the RF radiation, thereby causing a new shape and direction of the antenna beam 402. In the example shown in FIG. 4, the parasitic elements 204 are not implemented because Load 1 radiates the RF radiation from the driven element 404 in a way to causes no shape or direction of the antenna beam 402. This is shown in FIG. 4 with the antenna beam 402 forming a donut shape. In other examples, Load 1 may cause any known shape and direction depending on the antenna. It is noted that FIG. 4 includes dashed lines for illustrative purposes only to aid in viewing and should not be construed as being limiting or directed to a particular material or materials.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of a list should be construed as a de facto equivalent of any other member of the same list merely based on their presentation in a common group without indications to the contrary.

Unless otherwise stated, any feature described herein can be combined with any aspect or any other feature described herein.

Reference throughout the specification to "one example", "another example", "an example", means that a particular element (e.g., feature, structure, and/or characteristic) described in connection with the example is included in at least one example described herein, and may or may not be present in other examples. In addition, the described elements for any example may be combined in any suitable manner in the various examples unless the context clearly dictates otherwise.

The ranges provided herein include the stated range and any value or sub-range within the stated range. For example, a range from about 1 to about 20 should be interpreted to include not only the explicitly recited limits of from about 1 to about 20, but also to include individual values, such as 3, 7, 13.5, etc., and sub-ranges, such as from about 5 to about 15, etc.

In describing and claiming the examples disclosed herein, the singular forms "a", "an", and "the" include plural referents unless the context clearly dictates otherwise.

What is claimed is:

1. A method for beam steering and beam forming an antenna, comprising:
   illuminating an optical fiber with a light source, thereby transmitting a signal through the optical fiber to an electro-optical switch;
   actuating the electro-optical switch with the signal from the light source, thereby switching an electrical load in the electro-optical switch; and
   exciting at least one antenna element in an array of antenna elements that are part of the antenna with RF radiation radiated by a driven element via an RF transmission line and reradiated from parasitic elements, thereby beam steering and beam forming the antenna.

2. The method of claim 1, wherein there is one of:
i) an individual electro-optical switch connected to each individual antenna element;
ii) an individual electro-optical switch connected to a plurality of antenna elements; or
iii) a plurality of electro-optical switches connected to each individual antenna element.

3. The method of claim 1, wherein there is a single light source and a single optical fiber for each individual electro-optical switch.

4. The method of claim 1, wherein the optical fiber is a fiber bundle associated with a plurality of electro-optical switches and a single light source is used to illuminate the optical fiber bundle and actuate a plurality of electro-optical switches.

5. The method of claim 1, wherein the antenna elements are antenna elements that are part of the antenna selected from the group consisting of 2-dimensional patch antennas, phased array antennas, and 3-dimensional antennas.

6. The method of claim 5, wherein the 3-dimensional antennas are selected from the group consisting of an ESPAR antenna or a Yagi antenna.

7. The method of claim 1, wherein the light source is a free space diode laser or an assembly of optical elements diode laser.

8. The method of claim 1, wherein the electro-optical switches are composed of material selected from the group consisting of lithium niobate, group III-V or group II-VI semi-conductors, silicon, group IV semiconductors, alloys thereof, and heterostructures thereof.

9. A system for beam steering and beam forming an antenna, comprising:
a light source that illuminates an optical fiber, thereby transmitting a signal through the optical fiber;
an electro-optical switch that receives the signal from the optical fiber, wherein the signal actuates the electro-optical switch changing an electrical load in the electro-optical switch; and
an antenna element that is part of the antenna is excited by RF radiation radiated by a driven element via an RF transmission line and reradiated by parasitic elements causing the steering and beam forming of the antenna.

10. The system of claim 9, wherein the electro-optical switches are composed of material selected from the group consisting of lithium niobate, group III-V or group II-VI semi-conductors, silicon, group IV semiconductors, alloys thereof, and heterostructures thereof.

11. The system of claim 9, wherein the antenna elements are antenna elements in the antenna selected from the group consisting of 2-dimensional patch antennas, phased array antennas, and 3-dimensional antennas.

12. The system of claim 11, wherein the 3-dimensional antennas are selected from the group consisting of an ESPAR antenna or a Yagi antenna.

13. The system of claim 9, wherein the optical fiber is a fiber bundle associated with a plurality of electro-optical switches and a single light source is used to illuminate the optical fiber bundle and actuate a plurality of electro-optical switches.

14. The system of claim 9, wherein there is one of:
i) an individual electro-optical switch connected to each individual antenna element;
ii) an individual electro-optical switch connected to a plurality of antenna elements; or
iii) a plurality of electro-optical switches connected to each individual antenna element.

15. The system of claim 9, wherein the light source is a free space diode laser or an assembly of optical elements diode laser.

16. A method for beam steering and beam forming an antenna, comprising:
illuminating an optical fiber with a light source, thereby transmitting a signal through the optical fiber to an electro-optical switch;
actuating the electro-optical switch with the signal from the light source, thereby switching an electrical load in the electro-optical switch; and
exciting at least one antenna element in an array of antenna elements that is part of the antenna selected from the group consisting of 2-dimensional patch antennas, phased array antennas, and 3-dimensional antennas with RF radiation radiated by a driven element via an RF transmission line and reradiated from parasitic elements, thereby beam steering and beam forming the antenna.

* * * * *